(12) United States Patent
Hirotsu et al.

(10) Patent No.: US 10,044,494 B2
(45) Date of Patent: Aug. 7, 2018

(54) ELECTRONIC CONTROL DEVICE

(71) Applicant: Hitachi Automotive Systems, Ltd., Hitachinaka-shi, Ibaraki (JP)

(72) Inventors: Teppei Hirotsu, Tokyo (JP); Ryosuke Ishida, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/531,896

(22) PCT Filed: Nov. 25, 2015

(86) PCT No.: PCT/JP2015/082966
§ 371 (c)(1),
(2) Date: May 31, 2017

(87) PCT Pub. No.: WO2016/093055
PCT Pub. Date: Jun. 16, 2016

(65) Prior Publication Data
US 2017/0264423 A1    Sep. 14, 2017

(30) Foreign Application Priority Data
Dec. 10, 2014  (JP) .................................. 2014-249498

(51) Int. Cl.
*H04L 7/00* (2006.01)
*B60R 16/023* (2006.01)
(Continued)

(52) U.S. Cl.
CPC ........ *H04L 7/0016* (2013.01); *B60R 16/0231* (2013.01); *H04L 43/16* (2013.01); *H04L 69/28* (2013.01)

(58) Field of Classification Search
CPC ....... H04L 7/0016; H04L 69/28; H04L 43/16; B60R 16/0231; H03M 1/0836; F02D 37/02
(Continued)

(56) References Cited

U.S. PATENT DOCUMENTS 8,495,407 B2   7/2013 Watanabe
2004/0107041 A1   6/2004 Kobayashi et al.
(Continued)

FOREIGN PATENT DOCUMENTS

DE  10 2009 054 961 A1   6/2011
JP      2003-40054 A   2/2003
(Continued)

OTHER PUBLICATIONS

International Search Report (PCT/ISA/210) issued in PCT Application No. PCT/JP2015/082966 dated Feb. 16, 2016 with English translation (3 pages).
(Continued)

*Primary Examiner* — Phuong Phu
(74) *Attorney, Agent, or Firm* — Crowell & Moring LLP

(57) ABSTRACT

The present invention achieves, using simple circuits, timing synchronization among ECUs of an electronic control device which is configured from a driver ECU, a sensor ECU, and an integrated ECU which are connected over a network. This electronic control device is provided with a driver ECU for driving various loads for vehicular control, a sensor ECU for sampling various sensor signals, and an integrated ECU which is connected to the driver ECU and sensor ECU over a network and calculates command values to the various loads in accordance with various sensor data, the electronic control device being characterized in that the driver ECU has timer D for generating internal timing, the sensor ECU has timer S for generating internal timing, and
(Continued)

the integrated ECU has timer M serving as a reference for timer D and timer S.

5 Claims, 3 Drawing Sheets

(51) Int. Cl.
  *H04L 29/06* (2006.01)
  *H04L 12/26* (2006.01)
(58) Field of Classification Search
  USPC .......................................... 375/356, 371, 373
  See application file for complete search history.

(56) References Cited

U.S. PATENT DOCUMENTS

| | | | |
|---|---|---|---|
| 2004/0230347 A1* | 11/2004 | Sakurai | ................... F02D 37/02 |
| | | | 701/1 |
| 2005/0055469 A1 | 3/2005 | Scheele | |
| 2013/0058437 A1* | 3/2013 | Oshima | ............... H03M 1/0836 |
| | | | 375/316 |

FOREIGN PATENT DOCUMENTS

| | | |
|---|---|---|
| JP | 2004-190662 A | 7/2004 |
| JP | 2007-60400 A | 3/2007 |

OTHER PUBLICATIONS

Japanese-language Written Opinion (PCT/ISA/237) issued in PCT Application No. PCT/JP2015/082966 dated Feb. 16, 2016 (3 pages).
Extended European Search Report issued in counterpart European Application No. 15866943.2 dated Jun. 13, 2018 (nine (9) pages).

* cited by examiner

ELECTRONIC CONTROL DEVICE

TECHNICAL FIELD

The present invention relates to an electronic control device, and particularly to an electronic control device which includes a driver ECU for driving a load, a sensor ECU for acquiring sensor data, and an integrated ECU for generating a command value to the driver ECU from the sensor data and which is suitable when each of the ECUs is network-connected.

BACKGROUND ART

In recent years, complexity of vehicular control has increased, and functions and the number of IOs of an ECU have increased. In order to eliminate the complexity of the ECU, a configuration has been proposed in which sensor data acquisition and driver functions that are implemented with conventional ECUs are distributed on various sensors as a sensor ECU and a driver ECU and actuators and each ECU is network-connected.

In such a distributed architecture, a high-precision timing synchronization between ECUs is important in order to perform a high-precision control. In PTL 1, a high-precision timing synchronization is achieved by using a high-speed time division multiple access (TDMA) and compensating timing information in various sensor ECUs and driver ECUs.

CITATION LIST

Patent Literature

PTL 1: JP 2004-190662 A

SUMMARY OF INVENTION

Technical Problem

The invent ion disclosed in PTL 1 can realize high-precision timing synchronization, but it requires complex network protocol and a microcontroller for performing correction processing on various sensor ECUs and driver ECUs, thus a cost of the entire system is easily increased.

In view of the above, the present invention intends to provide an electronic control device that uses simple circuits on the side of the network ECU and the driver ECU to realize a timing synchronization of the various ECUs which are network-connected.

Solution to Problem

To achieve the above object, the present invention provides an electronic control device, including: a driver ECU that drives various loads for vehicular control; a sensor ECU that samples various sensor signals; and an integrated ECU that is connected to the driver ECU and the sensor ECU via a network and calculates command values for various loads from various sensor data, wherein the driver ECU includes a timer D for generating internal timing, the sensor ECU includes a timer S for generating internal timing, and the integrated ECU includes a timer M that is a reference of the timer D and the timer S.

Advantageous Effects of Invention

According to the present invention, since a variation of a timer in each ECU is corrected on the side of an integrated ECU, a high-precision timing synchronization of various ECUs can be realized with simple circuits on the side of the network ECU and the driver ECU.

DESCRIPTION OF EMBODIMENTS

First Embodiment

Hereinafter, a configuration and an operation of an electronic control device according to a first embodiment of the present invention will be described with reference to FIGS. 1 and 2.

Figure 1:
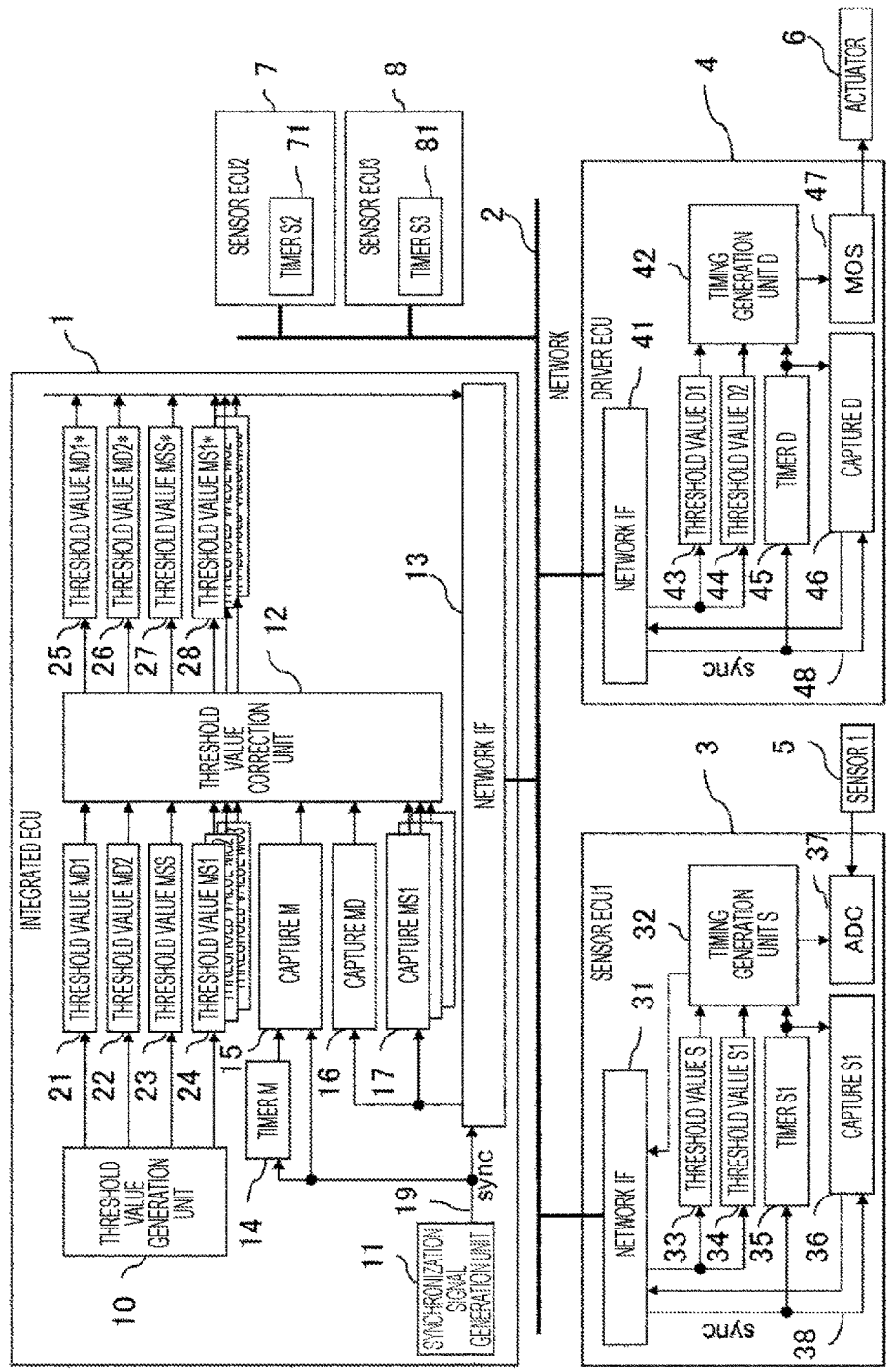
FIG. 1 is an overall block diagram of an electronic control device according to a first embodiment of the present invention.
Figure 2:
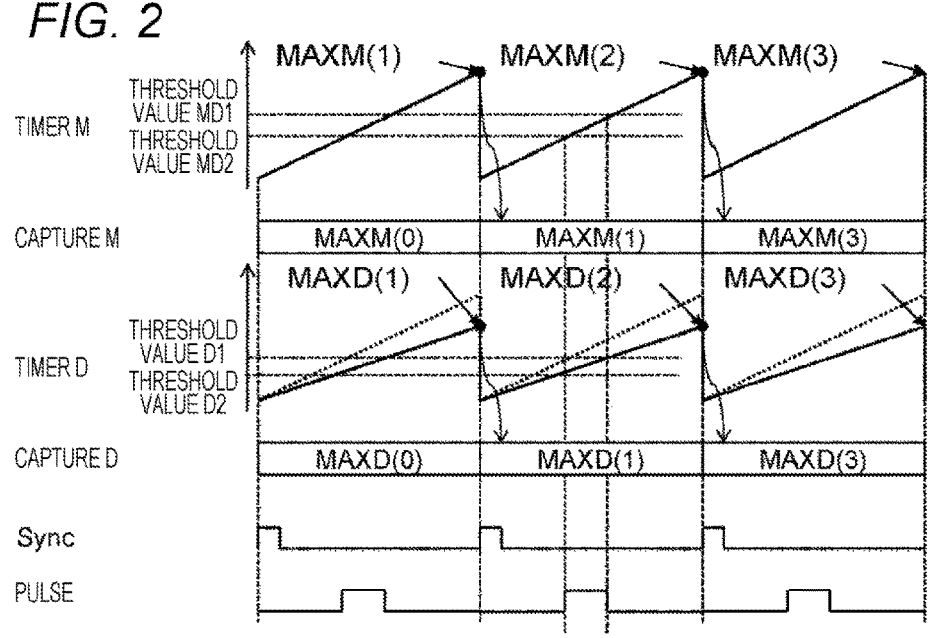
FIG. 2 is a timing chart showing a synchronization method between an integrated ECU and a driver ECU according to the first embodiment of the present invention.

FIG. 1 is an overall block diagram of a current control device according to the first embodiment of the present invention.

The electronic control device includes a driver ECU (4) that drives an actuator (6), a sensor ECU1 (3) that samples data from a sensor (5), a sensor ECU2 (7) that samples data from various sensors (not illustrated), a sensor ECU3 (8), and an integrated ECU (1) that calculates command values to the driver ECU (4) based on various sensor data. Each of the ECUs is connected with a network (2), and transmits and receives data for control via the network.

The integrated ECU (1) includes a threshold value generation unit (10) for generating a threshold value for indicating timings to the sensor ECU1 (3), the sensor ECU2 (7), the sensor ECU3 (8), and the driver ECU (4).

Based on a control algorithm (not illustrated), the threshold value generation unit (10) generates a threshold value to indicate timing at which the driver ECU (4) turns on the actuator (6), and stores the value in a threshold value register MD1 (21).

In addition, based on the control algorithm (not illustrated), the threshold value generation unit (10) generates a threshold value to indicate timing at which the driver ECU (4) turns off the actuator (6), and stores the value in a threshold value register MD2 (22).

In addition, based on the control algorithm (not illustrated), the threshold value generation unit (10) generates a threshold value to indicate timing at which the sensor ECU1 (3) samples data from the sensor (5), and stores the value in a threshold value register MS (23).

In addition, based on the control algorithm (not illustrated), the threshold value generation unit (10) generates a threshold value to indicate timing at which the sensor ECU1 (3) transmits the data on the network (2), and stores the value in a threshold value register MS1 (23-1).

In addition, based on the control algorithm (not illustrated), the threshold value generation unit (10) generates a threshold value to indicate timing at which the sensor ECU2 (7) transmits the data on the network (2), and stores the value in a threshold value register MS2 (23-2).

In addition, based on the control algorithm (not illustrated), the threshold value generation unit (10) generates a threshold value to indicate timing at which the sensor ECU3 (8) transmits the data on the network (2), and stores the value in a threshold value register MS3 (23-3).

The integrated ECU (1) includes a timer M (14) which serves as a reference for timing of the present electronic control system. The threshold value generation unit (10) calculates values using the timer M (14) as the reference and stores each of the values in each of the threshold value register MD1 (21), the threshold value register MD2 (22), the threshold value register MS1 (23-1), the threshold value register MS2 (23-2), and the threshold value register MS3 (23-3).

The integrated ECU (1) includes a synchronization signal generation unit (11) that resets the timer M (14), a timer S1 (35) in the sensor ECU1 (3), a timer S2 (71) in the sensor ECU2 (7), a timer S3 (81) in the sensor ECU3 (8), and a timer D (45) in the driver ECU (4) simultaneously and generates timings for capturing their values. The timings from the synchronization signal generation unit (11) are output to a network IF (13) via a signal sync (19), and then output to each of the ECUs via the network (2).

A value of the timer M (14) is captured at the timing indicated by the synchronization signal generation unit (11), and the captured value is stored in a capture register M (15).

Similarly, in the sensor ECU1 (3), a value of the timer S1 (35) is captured at the timing indicated by the synchronization signal generation unit (11), and the captured value is stored in a capture register S1 (36). The value of the capture register S1 (36) is transferred to the capture register MS1 (17-1) in the integrated ECU (1) via the network (2).

Similarly, in the sensor ECU2 (7), a value of the timer S2 (71) is captured at the timing indicated by the synchronization signal generation unit (11), and the captured value is stored in a capture register S2 (72). The value of the capture register S2 (72) is transferred to a capture register MS2 (17-2) in the integrated ECU (1) via the network (2).

Similarly, in the sensor ECU3 (8), a value of the timer S3 (81) is captured at the timing indicated the synchronization signal generation unit (11), and the captured value is stored in a capture register S3 (82). The value of the capture register S3 (82) is transferred to a capture register MS3 (17-3) in the integrated ECU (1) via the network (2).

Similarly, in the driver ECU (4), a value of the timer D (45) is captured at the timing indicated by the synchronization signal generation unit (11), and the captured value is stored in a capture register D (46). The value of the capture register D (46) is transferred to a capture register MD (16) in the integrated ECU (1) via the network (2).

In order to correct a difference in speed between the timer M (14) in the integrated ECU (1) and the timer D (45) in the driver ECU (4), a threshold value correction unit (12) corrects the threshold value according to a formula of a threshold value register MD1*=(the capture register D/the capture register M)*the threshold value register MD1, and stores the corrected value in the threshold value register MD1* (25). The value of the threshold value register MD1* (25) is transferred to a threshold value register D1 (43) in the driver ECU (4) via the network (2).

Similarly, in order to correct a difference in speed between the timer M (14) in the integrated ECU) and the timer D (45) in the driver ECU (4), the threshold value correction unit (12) corrects the threshold value according to a formula of a threshold value register MD2*=(the capture register D/the capture register M)*the threshold value register MD2, and stores the corrected value in a threshold value register MD1* (26). The value of the threshold value register MD1* (26) is transferred to a threshold value register D1 (44) in the driver ECU (4) via the network (2).

Similarly, in order to correct a difference in speed between the timer M (14) in the integrated ECU (1) and the timer S1 (35) in the sensor ECU1 (3), the threshold value correction unit (12) corrects the threshold value according to a formula of a threshold value register MS*=(a capture register S/the capture register M)*the threshold value register MS, and stores the corrected value in a threshold value register MS* (27). The value of the threshold value register MS* (27) is transferred to the threshold value register 5 (33) in the sensor ECU1 (3) via the network (2).

Similarly, in order to correct a difference in speed between the timer M (14) in the integrated ECU (1) and the timer S1 (35) in the sensor ECU1 (3), the threshold value correction unit (12) corrects the threshold value according to a formula of a threshold value register MS1*=(the capture register S/the capture register M)*the threshold value register MS1, and stores the corrected value in a threshold value register MS1* (27-1). The value of the threshold value register MS1* (27-1) is transferred to a threshold value register S1 (34) in the sensor ECU1 (3) via the network (2).

Similarly, in order to correct a difference in speed between the timer M (14) in the integrated ECU (1) and the timer S2 (71) in the sensor ECU2 (7), the threshold value correction unit (12) corrects the threshold value according to a formula of a threshold value register MS2* (the capture register S2/the capture register M)*the threshold value register MS2, and stores the corrected value in a threshold value register MS2* (27-2). The value of the threshold value register MS2* (27-2) is transferred to the threshold value register S2 (73) in the sensor ECU2 (7) via the network (2).

Similarly, in order to correct a difference in speed between the timer M (14) in the integrated ECU (1) and the timer S3 (81) in the sensor ECU3 (8), the threshold value correction unit (12) corrects the threshold value according to a formula of a threshold value register MS3*=(the capture register S3/the capture register M)*the threshold value register MS3, and stores the corrected value in a threshold value register MS3* (27-3). The value of the threshold value register MS3* (27-3) is transferred to a threshold value register S3 (83) in the sensor ECU3 (8) via the network (2).

In the driver ECU (4), a timing generation unit D (42) compares values of the threshold value register D1 (43) and the timer D (45), and generates timing to turn on an MOS (47). Further, the timing generation unit D (42) compares the values of the threshold value register D2 (44) and the timer D (45), and generates timing to turn off the MOS (47). As described above, the MOS (47) is controlled to be turned on and off to drive the actuator (6).

In the sensor ECU1 (3), a timing generation unit S (32) compares the values of the threshold value register S (33) and the timer S (35), and generates timing at which the AD converter (37) samples data from the sensor (5). Further, the timing generation unit S (32) compares the values of the threshold value register S1 (34) and the timer S (35), and generates timing to send the data to the network (2).

Similarly, in the sensor ECU2 (7) and the sensor ECU (8), the timer S2 (71), the threshold value register S2 (73), the timer S3 (81), and the threshold value register S3 (83) are used to generate timing to transfer the data to the network (2).

Hereinafter, with reference to FIG. 2, an operation of driving the actuator (6) by the electronic control device described with reference to FIG. 1 will be described.

In the integrated ECU (1), timings to turn on and off the actuator (6) are generated by using the threshold value MD1 and the threshold value MD2. Here, since there is a difference in speed between the timer M (14) in the integrated ECU (1) and the timer D (45) in the driver ECU (4), there is a problem that a timing deviation occurs if the same threshold value is used. Therefore, the threshold value is corrected by the aforementioned method. In this example, the timer D is slower in counting up than the timer M indicated by the dotted line. By correcting the threshold value according to the formula described above, it is possible to generate a waveform similar to the pulse timing based on the timer M on the side of the driver ECU.

Second Embodiment

Figure 3:
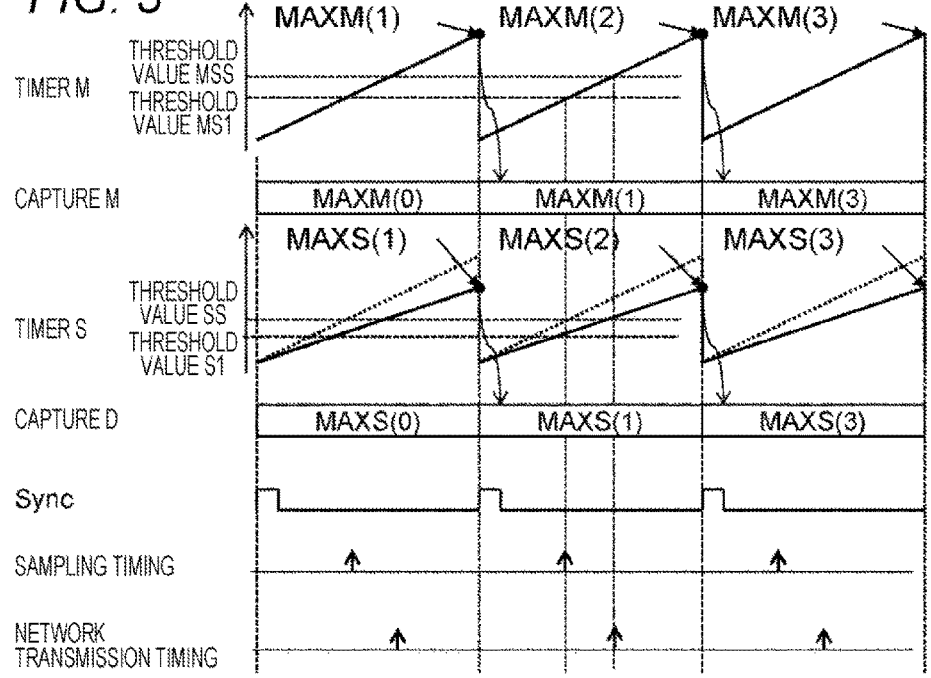
FIG. 3 is a timing chart showing a synchronization method between the integrated ECU and a sensor ECU according to a second embodiment of the present invention.

Hereinafter, a sensor data sampling operation of an electronic control device according to a second embodiment of the present invention will be described with reference to FIG. 3.

In the integrated ECU (1), a threshold value S and a threshold value S1 are used to generate timings for sampling a sensor data and transferring the data on the network. Here, since there is a difference in speed between the timer M (14) in the integrated ECU (1) and the timer S (35) in the sensor ECU1 (3), there is a problem that a timing deviation occurs if the same threshold value is used. Therefore, the threshold value is corrected by the aforementioned method. In this example, the timer S is slower in counting up than the timer M indicated by the dotted line. By correcting the threshold value according to the formula described above, it is possible to generate timings similar to the timings for sampling and transferring the data based on the timer M on the side of the sensor ECU.

Third Embodiment

Figure 4:
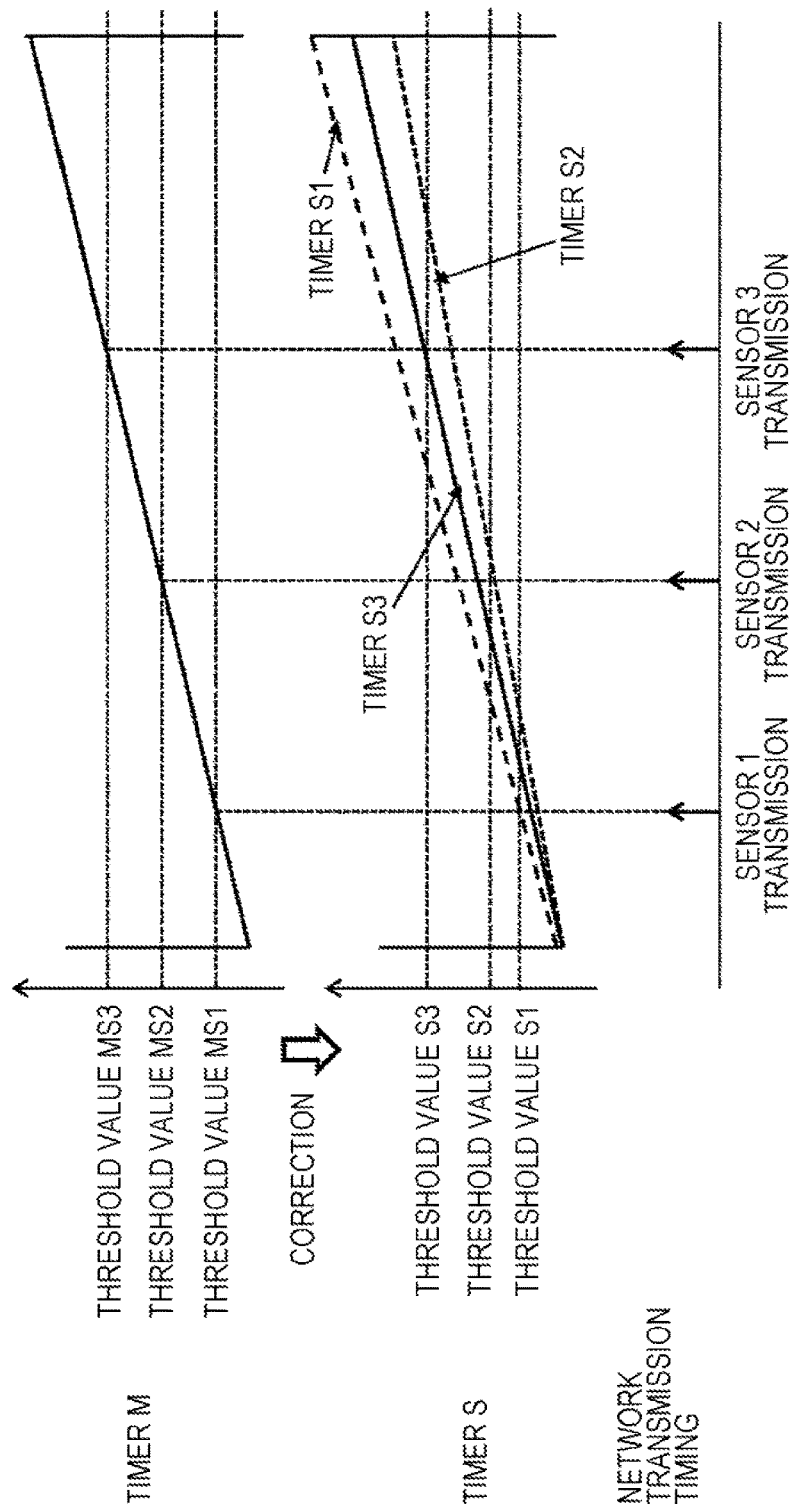
FIG. 4 is a timing chart of data transfer on a network of a plurality of sensor ECUs according to a third embodiment of the present invention.

Hereinafter, a network transfer operation of an electronic control device according to a third embodiment of the present invention will be described with reference to FIG. 4.

In the integrated ECU (1), the threshold value S1, the threshold value S1, and a threshold value S3 are used to generate data transferring timings of the sensor ECU1, the sensor ECU2, and the sensor ECU3. Here, since there is a difference in speed between the timer M (14) in the integrated ECU (1) and the timer S1 (35), the timer S2 (71), and the timer S3 (81) in the sensor ECUs, there is a problem that a timing deviation occurs if the same threshold value is used. Therefore, by correcting the threshold value according to the formula described above, it is possible to generate timings similar to the data transmission timings based on the timer M on the side of each of the sensor ECUs. In this example, by transferring the data at equal intervals, a data collision is avoided and the data is transferred with low delay. According to the application of the present invention, a data transfer with low delay is realized with a simple circuit without performing complicated network processing such as collision avoidance and priority determination on the side of the sensor ECU.

REFERENCE SIGNS LIST 1 integrated ECU
2 network
3 sensor ECU1
4 driver ECU
5 sensor
6 actuator
7 sensor ECU2
8 sensor ECU3

The invention claimed is:

1. An electronic control device, comprising:
a driver ECU that drives various loads for vehicular control;
a sensor ECU that samples various sensor signals; and
an integrated ECU that is connected to the driver ECU and the sensor ECU via a network and calculates command values for various loads from various sensor data,
wherein the driver ECU includes a timer D for generating internal timing,
the sensor ECU includes a timer S for generating internal timing, and
the integrated ECU includes a timer M that is a reference of the timer D and the timer S,
wherein the driver ECU includes a threshold value register D for generating internal timing and a capture register D that holds a value of the timer D at a certain timing,
the integrated ECU includes:
a capture register M that holds a value of the timer M at a certain timing;
a threshold value register MD* whose value is synchronized with a value of the threshold value register D via the network;
a capture register MD whose value is synchronized with a value of the capture register D via the network; and
a threshold value register MD for generating internal timing of the driver,
the timer D and the timer M are reset at the same timing,
values of the timer D and the timer M are captured at the same timing,
the captured value of the timer D is stored in the capture register D and the captured value of the timer M is stored in the capture register M respectively, and
a value that is stored in the threshold value register MD* is calculated based on a value stored in each of the threshold value register MD, the capture register MD, and the capture register M.

2. The electronic control device according to claim 1, wherein the driver ECU compares the values of the timer D and the threshold value register D to generate pulses that drive various loads.

3. An electronic control device, comprising:
a driver ECU that drives various loads for vehicular control;
a sensor ECU that samples various sensor signals; and
an integrated ECU that is connected to the driver ECU and the sensor ECU via a network and calculates command values for various loads from various sensor data,
wherein the driver ECU includes a timer D for generating internal timing,
the sensor ECU includes a timer S for generating internal timing, and
the integrated ECU includes a timer M that is a reference of the timer D and the timer S,
wherein the sensor ECU includes a threshold value register S for generating internal timing and a capture register S that holds a value of the timer S at a certain timing,
the integrated ECU includes:
a capture register M that holds a value of the timer M at a certain timing;

a threshold value register MS* whose value is synchronized with a value of the threshold value register S via the network;

a capture register MS whose value is synchronized with a value of the capture register S via the network; and a threshold value register MS for generating internal timing of the driver, the timer S and the timer M are reset at the same timing, values of the timer S and the timer M are captured at the same timing, the captured value of the timer S is stored in the capture register S and the captured value of the timer M is stored in the capture register M respectively, and a value that is stored in the threshold value register MS* is calculated based on a value stored in each of the threshold value register MS, the capture register MS, and the capture register M respectively.

4. The electronic control device according to claim 3, wherein the sensor ECU compares the values of the timer S and the threshold value register S to generate sampling timings of various sensor data.

5. The electronic control device according to claim 3, wherein the sensor ECU compares the values of the timer S and the threshold value register S to generate timing at which the sensor ECU transmits data on the network.

* * * * *